United States Patent Office 3,503,932
Patented Mar. 31, 1970

3,503,932
PROCESS FOR THE MANUFACTURE OF POLYURETHANES THAT CAN BE PROCESSED THERMOPLASTICALLY AND THAT ARE STABLE TO HYDROLYSIS
Franz Gottfried Reuter, Lemforde, Germany, assignor to Firma Elastomer AG, Chur, Switzerland
No Drawing. Filed Apr. 21, 1966, Ser. No. 545,530
Claims priority, application Germany, May 8, 1965, 1,595,236
Int. Cl. C08g 22/04, 22/10
U.S. Cl. 260—75
7 Claims

ABSTRACT OF THE DISCLOSURE

Polyurethanes are prepared by reacting a hydroxy terminated polyester prepared by esterification of a dicarboxylic acid and a glycol, an organic diisocyanate and a low molecular weight glycol, said polyester on said low molecular weight glycol containing a dodecylene grouping.

---

It has been proposed to produce polyurethanes that can be processed thermoplastically by reacting together a polyester, a polyether or a polyesteramide having free terminal hydroxyl groups, a diisocyanate and a low-molecular-weight glycol. The reaction can be effected either by the single-step process or by the pre-polymerization process.

Elastomers produced from polyesters by these processes are susceptible to hydrolysis because of the hydrophilic character of the polyesters and their saponifiability. In the course of development, a certain degree of improvement has been achieved in the resistance to hydrolysis of the finished products, this having been brought about, inter alia, by the use of polyesters made from higher-molecular-weight glycols and dicarboxylic acids. Elastomers made from polyesters of this kind, however, tend to harden at room temperature and they also display a high degree of permanent extension and only poor resistance to cold so that their field of application is limited.

The present invention is based on the observation that elastic polyurethanes that can be thermoplastically processed and that have a degree of resistance to hydrolysis hitherto unobserved and none of the above-mentioned drawbacks are obtainable when at least one of the reaction components used contains a dodecylene grouping.

The dodecylene grouping may be present in any one of the reactive components, namely, in the polyester or polyether component, the diisocyanate component or the glycol component (chain-lengthening component). It is also possible for two or more of the reactants to contain dodecylene groupings.

In principle, any polyester or polyether having free terminal hydroxyl groups can be used in the process, provided its molecular weight does not exceed 800 and provided they are essentially purely linear in structure.

As glycol, in addition to 1,12-dihydroxydecane, any aliphatic or cycloaliphatic glycol or a mixture thereof can be used as chain lengthener.

Isocyanates that can be used in accordance with the invention are 1,12-dodecanediisocyanate and all aromatic, aliphatic or cycloaliphatic diisocyanates, for example, diphenylmethane-4, 4'-diisocyanate, bis-toluylenediisocyanate, hexamethylene-1,6-diisocyanate, 1,4-diethylbenzene-β,β'-diisocyanate or naphthylene-1,5-diisocyanate.

The hardness of the end products can be varied over a wide range, for example, between 70 Shore A and about 60 Shore D.

The products can be filled, plasticized or coloured.

The following examples illustrate the invention:

EXAMPLE 1

A mixture comprising 1,000 grams of a hydroxypolyester made from 6 mols of hexane-dicarboxylic acid (adipic acid) and 7 mols of 1,12-dihydroxy-dodecane having a hydroxyl number of 56, a molecular weight of 2,000 and an acid number below 1, and 500 grams of 1,4-butanediol was reacted for a few minutes at 130° C. to 135° C. with 2,000 grams of hexamethylene-1,6-diisocyanate. The product of the reaction was poured, while in the liquid state on to heated tray moulds at a temperature of 110° C. and was left at that temperature for 10 minutes. The product was then allowed to cool and after it had been left for 48 hours at room temperature, it could be granulated and subsequently processed to a finished article on the usual injection moulders, extruders or roller mills. The articles were then heated for three days at 80° C. They acquired their optimum properties either after this heating process or after storage for six weeks at room temperature.

The physical properties of the articles manufactured in this manner were as follows:

Hardness, Shore A _____ 74
Tear strength, kp./cm.$^2$ _____ 368
Elongation at break, percent _____ 900
Shock elasticity, percent _____ 54
Resistance to tear propagation, kp./cm. _____ 26
Abrasion loss, mm.$^3$ _____ 45
Deformation under load (24 hours at 70°, 30 min. after removal of load), percent _____ 4
Resistance to cold (Roelig), ° C. _____ −30−−35

The figures for strength and elongation changed as follows after storage for several days under water at 80° C.:

|  | Strength | Elongation |
|---|---|---|
| After 3 days | 11.2% reduction | 13.6% reduction. |
| After 8 days | 13.1% reduction | 10.4% reduction. |
| After 16 days | 20.5% reduction | 3.1% increase. |
| After 24 days | 23.0% reduction | 7.2% increase. |
| After 31 days | 24.6% reduction | 7.8% increase. |

EXAMPLE 2

1,000 grams of a linear polyester (Desmophen 2001) made from hexanedicarboxylic acid and a mixture of diols and having a molecular weight of 2,000, a hydroxyl number of 56 and an acid number of about 2, were mixed with 363 grams of 1,12-dihydroxydodecane at 105° C. and the mixture was immediately reacted with 600 grams of diphenylmethane-4,4'-diisocyanate. Further processing of the reaction product was carried out in the manner described in Example 1.

The physical properties of the end product were as follows:

Hardness, Shore A _____ 94
Hardness, Shore D _____ 38
Tear strength, kp./cm.$^2$ _____ 488
Elongation at break, percent _____ 640
Resistance to tear propagation, kp./cm. DIN 53507 _ 35
Resistance to tear propagation, kp./cm. DIN 53515 _ 79
Shock elasticity _____ 32
Abrasion loss, mm.$^3$ _____ 73
Deformation under load (24 hours at 70° C., 30 min. after removal of load) percent _____ 34
Resistance to cold (Roelig), ° C. _____ −30−−35

The figures for strength and elongation changed as follows after storage for several days under water at 80° C.:

|  | Strength | Elongation |
|---|---|---|
| After 3 days | 14% reduction | 15% reduction. |
| After 8 days | 12% reduction | 10% reduction. |
| After 16 days | 20% reduction | 3% increase. |
| After 24 days | 23% reduction | 9% increase. |

EXAMPLE 3

1,000 grams of a polytetramethylene-etherglycol having a hydroxyl number of 121 and a molecular weight of 930 were reacted at 135° C. with 1170 grams of 1,12-dodecane-diisocyanate. 294 grams of 1,4-butanediol were admixed with the polyetherurethane so obtained at a temperature of 120° C. while stirring well. The product of the reaction was then further processed in the manner described in Example 1.

The physical properties of the end product were as follows:

| | |
|---|---|
| Hardness, Shore D | 62 |
| Tear strength, kp./cm.$^2$ | 460 |
| Elongation at break, percent | 660 |
| Shock elasticity, percent | 32 |
| Resistance to tear propagation, kp./cm. | 39 |
| Abrasion loss, mm.$^3$ | 48 |
| Deformation under load (24 hours at 70° C., 30 min. after removal of load), percent | 32 |
| Resistance to cold (Roelig), ° C. | −30 −−− −35 |

The figures for strength and elongation changed as follows after storage for several days under water at 80° C.:

| | Strength | Elongation |
|---|---|---|
| After 3 days | 8.5% reduction | 9.3% reduction. |
| After 24 days | 17.1% reduction | 5% reduction. |

What I claim is:

1. A polyurethane having improved hydrolysis resistance adapted to be thermoplastically processed which has been prepared by a process which comprises reacting a substantially linear hydroxy terminated polyester prepared by esterification of a dicarboxylic acid and a glycol, an organic diisocyanate and a low molecular weight aliphatic or cycloaliphatic glycol in a molar ratio of from 1.04 to 2 isocyanate groups per hydroxy group until a product adapted to be granulated and thermoplastically processed is obtained, said polyester or said low molecular weight glycol containing a dodecylene grouping.

2. The product of claim 1 wherein both the polyester and the low molecular weight glycol contain a dodecylene grouping.

3. The product of claim 1 wherein the glycol is 1,12-dihydroxy dodecane.

4. The product of claim 1 containing from about 1.5 to about 52 molar percent dodecylene groupings.

5. The product of claim 1 wherein the glycol is 1,4 butanediol.

6. The product of claim 1 wherein one of the reactants is a polyester prepared from adipic acid and 1,12-dihydroxy dodecane.

7. The product of claim 1 wherein the reactants are a polyester, 1,12-dihydroxy dodecane, and diphenylmethane-4,4 diisocyanate.

References Cited
UNITED STATES PATENTS

| 2,899,411 | 8/1959 | Schollenberger | 260—77.5 |
| 3,129,200 | 4/1964 | Muller et al. | 260—75 |

FOREIGN PATENTS

| 1,035,172 | 7/1966 | Great Britain. |
| 1,346,012 | 11/1963 | France. |
| 1,394,580 | 2/1965 | France. |

HOSEA E. TAYLOR, Jr., Primary Examiner

M. J. WELSH, Assistant Examiner

U.S. Cl. X.R.

260—77.5